United States Patent [19]
Göpfrich

[11] Patent Number: 6,084,791
[45] Date of Patent: Jul. 4, 2000

[54] CONTROL SYSTEM FOR SUPPLY RECOVERY OF ENERGY FROM A THREE-PHASE NETWORK INTO A CONVERTER WITH A VARIABLE VOLTAGE LINK

[75] Inventor: Kurt Göpfrich, Erlangen, Germany

[73] Assignee: Siemens Aktiengesellschaft, Munich, Germany

[21] Appl. No.: 09/355,670

[22] PCT Filed: Jan. 20, 1998

[86] PCT No.: PCT/DE98/00165

§ 371 Date: Jul. 30, 1999

§ 102(e) Date: Jul. 30, 1999

[87] PCT Pub. No.: WO98/34335

PCT Pub. Date: Aug. 6, 1998

[30] Foreign Application Priority Data

Jan. 31, 1997 [DE] Germany ............... 197 03 659

[51] Int. Cl.[7] ............................................. H02M 7/44
[52] U.S. Cl. ..................................... 363/98; 363/39
[58] Field of Search .......................... 323/207; 363/39, 363/40, 78, 80, 95, 98, 131, 132

[56] References Cited

U.S. PATENT DOCUMENTS

| | | | |
|---|---|---|---|
| 4,253,139 | 2/1981 | Weiss ........................................ | 363/95 |
| 5,034,874 | 7/1991 | Araki . | |
| 5,287,288 | 2/1994 | Brennen et al. .......................... | 363/50 |
| 5,345,375 | 9/1994 | Mohan ..................................... | 363/40 |
| 5,384,696 | 1/1995 | Moran et al. ............................. | 363/40 |
| 5,499,178 | 3/1996 | Mohan ..................................... | 363/39 |
| 5,513,090 | 4/1996 | Bhattacharya et al. .................. | 363/40 |
| 5,590,033 | 12/1996 | Kawano .................................... | 363/25 |
| 5,731,965 | 3/1998 | Cheng et al. ............................. | 363/41 |
| 5,883,796 | 3/1999 | Cheng et al. ............................. | 363/40 |

OTHER PUBLICATIONS

Youichi Itoh et al., "Easy Digital Control of Three–Phase PWM Converter", Intelec '91, Nov. 5, 1991, pp. 727–734.

*Primary Examiner*—Adolf Deneke Berhane
*Attorney, Agent, or Firm*—Kenyon & Kenyon

[57] ABSTRACT

A control arrangement according to an example embodiment of the present invention by means of which it is not only possible to minimize the harmonic content when energy is fed into/recovered from the three-phase network into a variable voltage link, but which also allows corresponding switching losses to be minimized. Furthermore, the control arrangement is also robust with respect to failure of at least one network phase, and is robust with respect to phase fluctuations. This is achieved in that not only digital angular function values whose phases are correct but which are phase-shifted equidistantly with respect to one another are stored in one or more function memory elements, but also associated digital signals which represent respective mathematical signs of these angular function values. These digital mathematical sign signals are compared in a comparator stage with digital mathematical sign signals measured via a phase detector of the individual network phases and if these compared values fail to coincide with one another, an inhibit signal is generated, by means of which the drive pulses for the converter active devices in the converter can be inhibited.

7 Claims, 1 Drawing Sheet

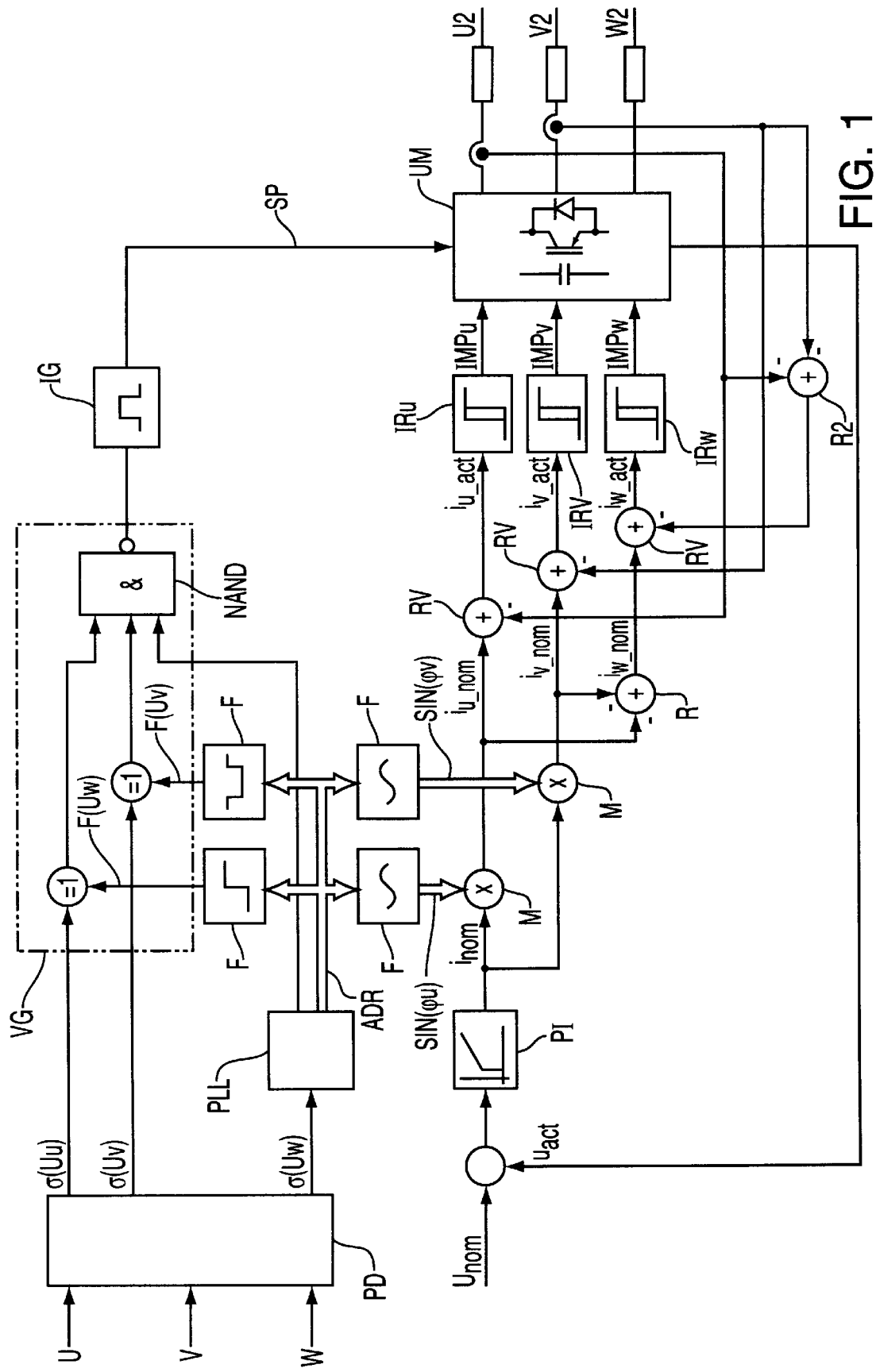

CONTROL SYSTEM FOR SUPPLY RECOVERY OF ENERGY FROM A THREE-PHASE NETWORK INTO A CONVERTER WITH A VARIABLE VOLTAGE LINK

FIELD OF THE INVENTION

The present invention relates to a control arrangement for feeding/recovering energy to/from a three-phase network into a converter having a variable voltage link, which can be used as a self-commutated mains converter of a variable voltage link converter.

BACKGROUND INFORMATION

Conventional converter active devices in a converter which is connected to a three-phase network maybe actuated by drive signals which are synchronized to the phase angle of the network voltage system using a phase locked loop. This conventional phase locked loop is based on the fact that a three-phase system can be represented by orthogonal components of a vector in a suitable coordinate system. In this case, actual values of the three-phase system are transformed by means of a vector rotator into the components of the voltage vector in a rotating coordinate system. The transformation elements of this vector transformation are obtained by supplying an angle regulator with the mean angle error between the transformed vector and a direction which is permanently defined in the rotating coordinate system. The output signal from this angle regulator governs the frequency of the rotating coordinate system and controls the frequency of oscillators whose output signals on the one hand supply the angular functions (which are required as transformation elements) of the transformation angle, while on the other hand also supplying the phase angle of the reference voltages which are synchronized to the network alternating voltage.

For stable operation of a three-phase network in the case of a self-commutated network converter of a converter with a variable voltage link, the earth currents $i_u$, $i_v$, $i_w$, taken from the network must be regulated. Generally, no reactive volt-amperes, or predetermined reactive volt-amperes should be taken from the network, so that the phase angle of the currents with respect to the network voltages must be permanently predetermined. The amplitude of the phase currents, on the other hand, is a function of the real power and reactive volt-amperes to be transmitted. It is thus necessary for the drive signals for the converter active devices to be synchronized to the network voltages. This can be done by the vector filter described above although, however, this results in a large number of components, and costs associated with them. Furthermore, owing to the finite dynamics of the angle control loop, network fluctuations result in an error angle between the phase voltages and reference voltages.

The network feedback effects on the three-phase network caused by converters are also problematic. Whenever energy is fed from the three-phase network to a variable voltage link, or is recovered from the variable voltage link to the three-phase network, using phase currents in the form of blocks, harmonics (5th, 7th, 9th, etc. harmonics of the network frequency) occur. However, such network feedback effects are undesirable in terms of electromagnetic compatibility.

In order to minimize such network feedback effects, a converter is known which uses a phase regulator to form an analog angle signal which is synchronized to a linked voltage, in order to address function memories in order to form digital angular function values. A DC voltage regulator supplies the nominal value for the amplitude of the system of alternating currents to be taken from the alternating voltage network. By multiplying the digital angular function values by the nominal amplitude, digital/analog converters supply a system of phase current nominal values, which system is compared with corresponding current actual values. The comparison results are used to drive lower-level current regulators, whose output signals supply drive signals for the active devices in the converter (e.g. transistors). However, such a control concept has the disadvantage that it is not robust if one phase of the three-phase network fails since, in such an event, the control system goes into a positive feedback mode, which results in the transistors that are used as converter active devices being destroyed.

SUMMARY

The of object an present invention is to provide a control arrangement by means of which the converter active devices in a converter having a variable voltage link can be driven such that the phase currents are in synchronism with the voltage of the three-phase network (that is to say with a phase shift of 0 or some other predetermined phase shift) by means of which network feedback effects into the three-phase network, in particular from harmonics, can be minimized and by means of which, furthermore, it is possible to prevent the control system from going to a positive-feedback situation if one phase fails. This is intended to improve the robustness of the feeding/recovery unit in comparison with previously known solutions.

According to the present invention, this object is achieved by a control arrangement for feeding/recovering energy to/from a three-phase network into a converter having a variable voltage link, with the following features:

1.1 a phase detector which, for each phase, provides the present mathematical sign for the corresponding phase as a digital signal, 1.2 a phase locked loop for producing a binary address signal, which is synchronized to the detected phase angle and can be driven by one of the digital signals which provide the present mathematical sign for the corresponding phase, 1.3 a function memory element which can be driven by the binary address signal for producing at least two digital angular function values whose phases are correct but which are phase-shifted with respect to one another, as well as associated digital signals, which represent the respective mathematical sign of the angular function values, 1.4 at least two digital/analog converter stages, to whose inputs the respective digital angular function values can be applied, 1.5 at least two multiplier stages, by means of which the analog angular values which are present on the input side can be weighted with a predeterminable current nominal value, for producing a system of analog alternating current nominal values of the same amplitude, whose phases are correct but which are phase-shifted with respect to one another, 1.6 a control comparison stage, to which the analog alternating current nominal value system and an analog alternating current actual value system which can be detected by alternating current measurement elements, can be supplied in order to form phase-related difference values, for producing an analog reference signal for each phase from the respectively associated difference value, 1.7 for each phase, a current regulator, which can be driven by the respective reference signal of this phase, for producing respective drive pulses for converter active devices which are connected to the corresponding phase of the connection on the alternating-current side, 1.8 a comparator stage for producing an inhibit signal for inhibiting the drive pulses for the converter active devices in the situation when at least one digital signal, which is provided by the phase detector and represents the present mathematical sign of a phase, differs from the corresponding digital signal which is provided by the function memory element and represents the respective mathematical sign of the angular function values.

The advantages that can be achieved with a control arrangement according to the present invention are, in particular, that synchronism is achieved between the phase currents and the voltage of the three-phase network, that the harmonic elements when energy is fed from the three-phase network into the variable voltage link and is recovered from the variable voltage link to the three-phase network is minimized, and that the control arrangement is robust in the event of failure of at least one phase of the three-phase network.

In one example embodiment of the control arrangement according to the present invention, the arrangement has an advantageous voltage regulator added to it. This is achieved by the following further feature:

2.1 a voltage regulator, to which a difference from a predetermined voltage nominal value and a fed-back voltage actual value can be applied, for producing the current nominal value, wherein the voltage regulator is designed as a proportional regulator having an integral response.

In a another example embodiment of the control arrangement according to the present invention, a particularly advantageous lower-level current regulator is provided for driving the converter active devices. This furthermore allows the switching losses to be minimized. This is achieved by the following further feature:

3.1 each current regulator for each phase is designed as a hysteresis regulator having a predeterminable, finite hysteresis width.

An alternative example embodiment of the present invention provides a further capability for optimizing the lower-level current regulator. This is achieved by the following further feature:

4.1 each current regulator for each phase is designed as a pulse-width-modulation regulator, whose frequency can be predetermined, but is constant.

In a further example embodiment of the control arrangement according to the present invention, the complexity of components within the control arrangement is further minimized in that the function memory element, the digital/analog converter stages and the multiplier stages need be designed only for two phases of the three-phase network. This is achieved by the following further feature:

5.1 a computation means (R) for producing a third alternating current nominal value, whose phase is correct, from just two of the analog alternating current nominal values of the same amplitude, whose phases are correct but which are phase-shifted with respect to one another, and which are provided via the function memory element, the digital/analog converter stages and the multiplier stages.

In a further example embodiment of the control arrangement according to the present invention, a predeterminable tolerance band can be provided for phase fluctuations. For example, this makes it possible for a phase shift of 10° to be permissible, while any phase shift going beyond this leads to the drive pulses for the converter active devices being inhibited. This is achieved by the following further feature:

6.1 a pulse lengthening element having a predeterminable lengthening time for lengthening the inhibit signal.

A further example embodiment of the control arrangement according to the present invention furthermore makes it possible for changes in the phase sequence to be identified. This is achieved by the following further feature:

7.1 digital signals, which represent angular function values as well as the respective mathematical sign of the angular function values, for a plurality of assignments to the phase angle of the three-phase network are stored in the function memory element, wherein the corresponding memory area for each assignment can be set via the address signal corresponding to a clockwise/counter-clockwise rotating field identification.

BRIEF DESCRIPTION OF THE DRAWING

FIG. 1 shows a block diagram of a control arrangement according to an example embodiment of the present invention for feeding energy sinusoidally from a three-phase network into a converter having a variable voltage link, and for recovering energy from the converter to the three-phase network, which control arrangement allows synchronism between the phase currents and the voltage of the three-phase network and is robust against failure of at least one network phase.

DETAILED DESCRIPTION

The illustration in FIG. 1 shows a control arrangement according to the present invention based on the example of energy being fed sinusoidally from a three-phase network (which is not shown to assist clarity) with the phases U, W, V to a converter UM having a variable voltage link, and being recovered from the converter UM to the three-phase network. In general, the aim is to load the three-phase network symmetrically, which means that the currents taken from the phases U, W, V on the AC voltage-side connection of the converter correspond to a symmetrical system of current nominal values $i_{u\_nom}$, $i_{w\_nom}$, $i_{v\_nom}$. The system of these said symmetrical alternating current nominal values can be described by an amplitude nominal value $i_{nom}$ and a corresponding phase angle, from which the three said alternating current nominal values are in each case obtained as signals which are phase-shifted through 120° with respect to one another and have a common amplitude, proportional to $i_{nom}$.

The zero crossing or some other predetermined fixed phase angle for each of the individual network phases U, W, V is detected in each case by means of a phase detector PD. The phase-shift with respect to the three-phase network may be arbitrary, but must be defined. Such a phase angle must therefore be permanently predetermined. A digital signal $\sigma(Uu)$, $\sigma(Uv)$, $\sigma(Uw)$ is derived from this for each of the network phases via the phase detector PD, and is in each case used to denote the mathematical sign of the corresponding network phase U, W, V in digital form.

A phase locked loop PLL is driven by any one of these said digital signals and, on its output side, provides binary address signals ADR which are synchronized to the detected phase angle.

This binary address signal ADR is used to drive one or, alternatively, more functional memory elements F, which output at least two digital angular function values whose phases are correct but which are phase-shifted equidistantly with respect to one another. In this case, it is irrelevant to the invention whether these at least two angular function values are stored in a single function memory element F, or else in function memory elements F provided separately for this purpose. The present exemplary embodiment shows a control arrangement for feeding energy sinusoidally from a three-phase network and for recovering energy to said three-phase network, for which reason the digital angular function values whose phases are correct and which are stored in the function memory element or elements F describe a sinusoidal waveform SIN(χu), SIN(χv). It is possible for separate—sinusoidal in the exemplary embodiment—angular function values to be stored for all three phases U, W, V. As is described further below, it is, however, particularly advantageous to store only such angular function values for those network phases—in the exemplary embodiment the phases U and V—which are not used for driving the phase locked loop PLL (in the present exemplary embodiment, this is the network phase W). In addition to the already mentioned angular function values for at least two network phases U, V, the waveform of the respective mathematical sign (associated with the angular function values) of the angular function values is also stored, in the form of digital signals F(Uu) and F(Uv), in the function memory element or elements F, so that the function memory element or elements F also provide the respective mathematical sign of the angular function values separately for each angular function value provided for the corresponding network phase. The mathematical sign values F(Uu), F(Uv) which are provided in this case have, for example, the same form of digital signals as the digital mathematical sign signals σ(Uu), σ(Uv) and σ(Uw) provided by the phase detector PD. In the illustration according to FIG. 1, digital/analog converter stages (which are not shown in order to assist clarity) convert the respective digital angular function values SIN(χu), SIN(χv) supplied to these digital/analog converter stages on the input side into corresponding analog signals, which are phase-shifted equidistantly with respect to one another. These analog values, which are phase-shifted equidistantly with respect to one another, are passed to at least two multiplier stages M, by means of which the analog angular values that occur are weighted with a predeterminable current nominal value $i_{nom}$.

This current nominal value $i_{nom}$ may be provided, for example, on the output side by a voltage regulator PI, to which the difference from a predeterminable voltage nominal value $u_{nom}$ and a fed-back voltage actual value $u_{act}$ can be applied. This voltage regulator PI is preferably designed as a proportional regulator having an integral response.

The output signals from the at least two multiplier stages M then directly represent analog alternating current nominal values. In the situation when digital angular function values whose phases are correct but which are phase-shifted equidistantly with respect to one another are stored for all three phases in the function memory element or elements F, three digital/analog converter stages as well as three multiplier stages M are necessary in a corresponding manner, so that all three analog alternating current nominal values $i_{\_nom}$, $i_{\_vnom}$ and $i_{\_wnom}$ are available on the output side. However, in the exemplary embodiment shown in the illustration according to FIG. 1, and as already mentioned, only the two phases U and V which are not used for driving the phase locked loop PLL are stored in the function memory element or elements F, so that only two digital/analog converter stages and two multiplier stages M are required and are shown. In the latter exemplary embodiment, which is shown in the illustration according to FIG. 1, use is made of the fact that the algebraic sum of the current actual values, which is referred to as the zero component is equal to zero. This relationship is explained by the following calculation equation:

$$i_{u\_act} + i_{v\_act} + i_{w\_act} = 0$$

The current nominal value for the third phase W, which is not stored as angular function values in the function memory element or elements, can thus be defined by a computation element R in accordance with the following calculation equation:

$$i_{w\_nom} = -(i_{u\_nom} + i_{v\_nom}).$$

The computation element R may be, for example, in the form of an adder or in the form of an appropriately programmed microprocessor. The last required alternating current nominal value $i_{w\_nom}$ is thus produced at the output of computation element R. thus producing a system of analog alternating current nominal values $i_{u\_nom}$, $i_{v\_nom}$, $i_{w\_nom}$ of the same amplitude, whose phases are correct but which are phase-shifted with respect to one another. In principle, the phase shift between the output signals from the function memory element or elements F need not be 120°. For example, a phase shift of 90° may also be provided, as a result of which the angular function values that are formed then represent the orthogonal components of a vector whose magnitude is normalized in a round coordinate system. The components of a current nominal value vector can be formed from this by multiplication by the predetermined current nominal value $i_{nom}$. Such a vector is often used to describe completely a three-phase system without any zero component, with the individual alternating current nominal values $i_{u\_nom}$, $i_{v\_nom}$ and $i_{w\_nom}$ being formed as projections of the vector onto axes rotated through 120° in space with respect to one another. These are often calculated by means of a so-called "two/three coordinate converter".

The system described above of alternating current nominal values $i_{u\_nom}$, $i_{v\_nom}$ and $i_{w\_nom}$ which are phase-shifted equidistantly with respect to one another is passed, for each phase, to a control comparison stage RV, whose input side is also supplied with an analog actual value system of the alternating currents $i_{u\_act}$, $i_{v\_act}$ and $i_{w\_act}$. The corresponding alternating current actual values are detected via alternating current measurement elements. In this case, use can again be made of the fact that a network phase can be reconstructed from the two other network phases in accordance with the two calculation equations described above. Such a third alternating current actual value, for example $i_{w\_act}$ is determined in an analogous manner to that in the computation element R by means of a second computation element R2. A phase-related difference value is produced for each phase at the output of the said control comparison stages RW, and is used as an analog reference signal for each phase U, V, W for driving a lower-level current regulator Iru, Irv, IRw with one such current regulator being provided separately for each phase.

Each of these said current regulators Iru, Irv, IRw is used for producing respective drive pulses IMPu, IMPv, IPMw for the converter active devices in the converter UM, which are connected to the corresponding phase of the connection on the alternating current side. The three phases U, V, W, are thus regulated separately from one another. There are two advantageous options for providing the respective lower-level current regulators Iru, IRv, Irw.

On the one hand, the said current regulators may be designed as pulse-width-modulation current regulators PWM. Such pulse-widthmodulation regulators use a constant frequency. The current ripple within one cycle of the network phase is not constant. It increases in the region of the zero crossings. In the frequency domain, it is found in this case that the clock frequency and multiples of it are clearly evident.

The lower-level current regulators can be produced with considerably less complexity as hysteresis current regulators. In this case, a tolerance band—the hysteresis—is permanently predetermined as a finite value. The variable in this case is the frequency. This increases in the region of the voltage zero crossings. However, this in fact represents an enormous advantage. Since the voltage and current zero crossings are in phase (are synchronized), the switching losses remain minimal, despite the high frequency in this region. In the case of a lower-level current regulator Iru, IRv, IRw designed as a hysteresis regulator, the converter active devices (which are not shown, in order to assist clarity) are always switched over whenever the associated current actual value for this phase differs from the associated current nominal value by more than the predetermined hysteresis width. This results in two-point regulation of the current for each phase U, V, W, which thus, in practice, always moves within a predetermined tolerance band about the nominal value. The difference region occurs instead of the clock frequency and its harmonics as a noise band which is raised only slightly, but which remains orders of magnitude lower with respect to the limits for lower-level current regulators designed as pulse-width-modulation current regulators.

In order to avoid the risk, already mentioned in the introduction, of the control arrangement entering positive feedback if at least one phase fails, as a result of which the converter active devices, which are designed, for example, as so-called IGBT transistors (IGBT=Insulated Gate Bipolar Transistor), can be destroyed, the control arrangement shown in the illustration in FIG. 1 has, according to the present invention, circuit measures added to it to prevent this. A comparator stage VG is provided for this purpose, which produces an inhibit signal SP if at least one network phase U, V, W fails or if undesirable phase fluctuations occur, by means of which inhibit signal SP the drive pulses IMPu, IMPv and IMPw for the converter active devices are inhibited. The inhibiting process can be carried out, for example, using a transistor, a contactor or any other desired switching means. The comparator stage VG is supplied with the digital mathematical sign signals σ(Uw), σ(Uv), σ(Uu), which are produced on the output side of the phase detector PD, as well as with the digital signals F(Uu), F(Uw) which are produced by the function memory element or elements F and represent the respective mathematical sign of the angular function values. This makes it possible to carry out a comparison between the mathematical sign F(Uu) or F(Uw) read from the function memory element or elements F.

In the case of the exemplary embodiment, in which appropriate angular function values as well as associated digital signals which represent the respective mathematical signs of the angular function values are stored only for two network phases U, V in the function memory element or elements F, a comparison between the mathematical signs read from the function memory element or elements F and the mathematical signs measured via the phase detector PD is carried out only for the two said phases. This is done using appropriate comparison modules "=1", which produce a digital signal "1", or High, on the output side in the event of a match. The phase W which is not stored in the functional memory element or elements F and is used to drive the phase locked loop PLL is looped through the phase locked loop, and is likewise passed to the comparator stage VG. The output signals from the comparators "=1" as well as the last-mentioned, measured digital mathematical sign signal for the phase W are passed to an inverting AND gate NAND, which produces the already mentioned inhibit signal SP on the output side. In the illustration shown in FIG. 1, this inhibit signal is passed to the converter UM, in which the already mentioned converter active devices are arranged.

An additional improvement is obtained by connecting a pulse lengthening element IG, with a predeterminable pulse lengthening time, downstream of the output of the comparator stage VG. This allows a tolerance to be set for phase fluctuations which are not yet intended to lead to the converter active devices being inhibited. For example, it is possible to preset a permissible phase shift of 10° by using the pulse lengthening element IG to suppress a short "1" signal, caused by such a phase shift, at the output of the comparator stage VG.

The pulse lengthening time can in this case be set such that the pulse lengthening just suppresses the one signal which occurs for a maximum phase shift of 10°. The pulse lengthening element IG can thus be used to permanently predetermine a tolerance for phase fluctuations, thus preventing the converter active devices from being inhibited even at minor phase fluctuations. However, despite the pulse lengthening element, a failure of at least one of the phases U, V, W leads to the inhibit signal SP assuming the "1" or High state, and to the drive pulses for the converter active devices being inhibited via the corresponding switching means.

The explanations so far have always been based on a fixed assignment between the phase angle of the three-phase network and the content of the function memory element or elements F (angular function values and associated mathematical sign). However, this is no longer true if the phase sequence changes. In order to allow reliable operation of a control arrangement according to the present invention in a case such as this as well, digital signals which represent angular function values as well as the respective mathematical sign of the angular function values can be stored for a plurality of assignments of phase angle of the three-phase network in the function memory element or elements F for the corresponding network phases. The required assignment can then be set via the corresponding memory area, by means of the binary address signal ADR, with the aid of clockwise/counterclockwise rotating field identification.

Furthermore, it is also feasible to use the control arrangement according to the present invention in a modified form in the field of compensation systems, by using it to suppress any reactive volt-amperes that may occur. This can be achieved, for example, by determining the phase angle of the individual three phases U, V, W via a phase detector PD at the factory input, so that corresponding digital mathematical sign symbols σ are produced, which describe the phase angle at the factory input. These can then be used, for example, to drive an adder, which is arranged downstream of the function memory element or elements.

What is claimed is:

1. A control arrangement for feeding/recovering energy from a three-phase network into a converter having a variable voltage link, comprising:

a phase detector providing, as digital signals, a corresponding present mathematical sign for each phase of the three-phase network;

a phase-locked loop producing a binary address signal, the phase-locked loop being synchronized to a detected phase angle and being driven by the corresponding present mathematical sign of one phase of the three-phase network;

a function memory element driven by the binary address signal, the function memory element producing at least two digital angular function values having phases which are correct but which are phase-shifted with respect to one another, the function memory element further producing associated digital signals representing respective mathematical signs of the at least two digital angular function values;

at least two digital/analog converter stages receiving the at least two digital angular function values and producing at least two analog angular function values;

at least two multiplier stages weighting the at least two analog angular function values with a current nominal value, the at least two multiplier stages producing a system of analog alternating current nominal values of a same amplitude, having correct phases, and being phase-shifted with respect to one another;

a control comparison stage receiving the system of analog alternating current values and an analog alternating current actual value system, and forming a respective phase-related difference value for each phase of the three-phase network, the analog alternating actual value system being detected by alternating current measurement elements, the control comparison stage producing a respective analog reference signal for each phase of the three-phase network as a function of the respective phase-related difference value;

a respective current regulator for each respective phase of the three-phase network, each respective current regulator being driven by the respective analog reference signal corresponding to the respective phase and producing respective drive pulses for a converter active device, the converter active device being coupled to the respective phase on an alternating-current side; and a comparator stage producing an inhibit signal to inhibit the drive pulses for the converter active device when at least one corresponding present mathematical sign from the phase detector differs from a corresponding one of the associated digital signals representing respective mathematical signs of the at least two digital angular function values from the function memory element.

2. The control arrangement according to claim 1, further comprising:

a voltage regulator receiving a predetermined voltage nominal value and a fed-back voltage actual value and producing the current nominal value, the voltage regulator being a proportional regulator having an integral response.

3. The control arrangement according to claim 1, wherein each current regulator includes a hysteresis regulator having a predeterminable, finite hysteresis width.

4. The control arrangement according to claim 1, wherein each current regulator includes a pulse-width-modulation regulator, the pulse-width-modulation regulator having a predetermined constant frequency.

5. The control arrangement according to claim 1, further comprising:

a computation arrangement producing a third alternating current nominal value from only two of the system of analog alternating current nominal values, the third alternating current nominal value having a correct phase.

6. The control arrangement according to claim 1, further comprising:

a pulse lengthening element having a predeterminable lengthening time for lengthening the inhibit signal.

7. The control arrangement according to claim 1, wherein the function memory element stores, for a plurality of assignments for the three-phase network, the at least two digital angular function values and the associated digital signals representing respective mathematical signs of the at least two digital angular function values, wherein a corresponding memory area for each assignment is set via the address signal corresponding to a clockwise/counter-clockwise rotating field identification.

* * * * *